United States Patent
Verma (10) Patent No.: US 10,155,281 B2
(45) Date of Patent: Dec. 18, 2018

(54) METHODS AND PROCESS FLOWS FOR DIFFUSION BONDING AND FORMING METALLIC SHEETS

(71) Applicant: The Boeing Company, Chicago, IL (US)

(72) Inventor: Ravi Verma, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 15/010,159

(22) Filed: Jan. 29, 2016

(65) Prior Publication Data

US 2017/0216958 A1    Aug. 3, 2017

(51) Int. Cl.
| | |
|---|---|
| *B23K 20/02* | (2006.01) |
| *B23K 20/233* | (2006.01) |
| *B23K 20/12* | (2006.01) |
| *B23K 20/24* | (2006.01) |
| *B23K 31/02* | (2006.01) |
| *B23K 101/00* | (2006.01) |
| *B23K 101/18* | (2006.01) |

(52) U.S. Cl.
CPC ............ *B23K 20/02* (2013.01); *B23K 20/023* (2013.01); *B23K 20/122* (2013.01); *B23K 20/2336* (2013.01); *B23K 20/24* (2013.01); *B23K 31/02* (2013.01); *B23K 2101/006* (2018.08); *B23K 2101/18* (2018.08); *F05D 2230/236* (2013.01)

(58) Field of Classification Search
USPC ....................................................... 228/193
See application file for complete search history.

(56) References Cited

U.S. PATENT DOCUMENTS

| | | | |
|---|---|---|---|
| 3,927,817 A | 12/1975 | Hamilton et al. | |
| 4,732,312 A | 3/1988 | Kennedy et al. | |
| 5,611,944 A * | 3/1997 | Gilkinson | ............ B21D 26/055 219/117.1 |

FOREIGN PATENT DOCUMENTS

EP         0 398 760        11/1990

OTHER PUBLICATIONS

European Patent Office, Extended European Search Report for related European patent application EP 16198692, dated Jul. 20, 2017.

* cited by examiner

*Primary Examiner* — Erin B Saad
(74) *Attorney, Agent, or Firm* — DASCENZO Intellectual Property Law, P.C.

(57) ABSTRACT

Methods and process flows for diffusion bonding and forming metallic sheets are disclosed herein. The methods include stacking a first metallic sheet and a second metallic sheet to define a sheet stack. The methods further include creating a pneumatic seal between the first metallic sheet and the second metallic sheet to define a sealed sheet stack that defines a pneumatically isolated region. The methods also include increasing a surface area of the sealed sheet stack to define an expanded sheet stack. The methods further include compressing at least a portion of the expanded sheet stack to form a diffusion bond between a corresponding portion of the first metallic sheet and an opposed portion of the second metallic sheet thereby defining a diffusion bonded sheet stack.

20 Claims, 6 Drawing Sheets

METHODS AND PROCESS FLOWS FOR DIFFUSION BONDING AND FORMING METALLIC SHEETS

FIELD

The present disclosure relates to methods and process flows for diffusion bonding and forming metallic sheets.

BACKGROUND

Diffusion bonding is a solid-state joining technique that may be utilized to join two metallic components. Diffusion bonding involves solid-state diffusion to intermingle atoms from the two metallic components and may be performed by pressing the two metallic components together, often at elevated temperatures.

In order for diffusion bonding to be effective, the two metallic components generally must be brought into direct, metal-to-metal contact. The presence of dirt, debris, and/or residues on the two metallic components may prevent this direct, metal-to-metal contact, thereby preventing diffusion bonding of the two metallic components and/or decreasing a strength of any diffusion bond that may be formed. Similarly, the presence of a surface and/or native oxide layer on the two metallic components also may prevent direct, metal-to-metal contact, thereby preventing diffusion bonding of the two metallic components and/or decreasing the strength of the diffusion bond.

When practical, diffusion bonding may provide an economical and/or efficient mechanism via which two metallic components may be joined together. However, some metals, such as aluminum, oxidize quickly upon exposure to atmospheric oxygen and/or form a tenacious surface oxide layer that is difficult to remove. Such metals may be difficult to diffusion bond.

While some techniques have been developed to diffusion bond such metals, these techniques may not be broadly applicable and/or may be costly and/or impractical to implement. Thus, there exists a need for improved methods and process flows for diffusion bonding and forming metallic sheets.

SUMMARY

Methods and process flows for diffusion bonding and forming metallic sheets are disclosed herein. The methods include stacking a first metallic sheet and a second metallic sheet to define a sheet stack. The sheet stack may include a first internal surface, which is defined by the first metallic sheet, and a second internal surface, which faces toward the first internal surface and is defined by the second metallic sheet.

The methods further include creating a pneumatic seal between the first metallic sheet and the second metallic sheet to define a sealed sheet stack that defines a pneumatically isolated region. The first metallic sheet, or the first internal surface thereof, the second metallic sheet, or the second internal surface thereof, and the pneumatic seal may bound and/or define the pneumatically isolated region.

The methods also include increasing a surface area of the sealed sheet stack to define an expanded sheet stack. This may include increasing a surface area of the sealed sheet stack, increasing a surface area of the first internal surface, and/or increasing a surface area of the second internal surface. The increasing also may include increasing by at least a threshold surface area increase and may be a result of, or brought about by, a concurrent reduction in thickness of the sealed sheet stack.

The methods further include compressing at least a portion of the expanded sheet stack to form a diffusion bond between a corresponding portion of the first metallic sheet and an opposed portion of the second metallic sheet thereby defining a diffusion bonded sheet stack. Additionally or alternatively, the diffusion bonded sheet stack may be defined by pressing at least a portion of the first internal surface against an opposed portion of the second internal surface to diffusion bond the portion of the first metallic sheet to the opposed portion of the second metallic sheet.

DESCRIPTION

FIGS. 1-15 provide examples of methods 200, according to the present disclosure, for diffusion bonding a first metallic sheet 61 and a second metallic 64 sheet to one another, of steps of a process flow 100 that may be utilized to diffusion bond the first metallic sheet to the second metallic sheet, of diffusion bonded sheet stacks 92 that may be generated utilizing process flow 100 and/or methods 200, of formed metallic parts 98 that may be generated from the diffusion bonded sheet stacks, and/or of aircraft 20 that may include and/or utilize the formed metallic parts. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 1:
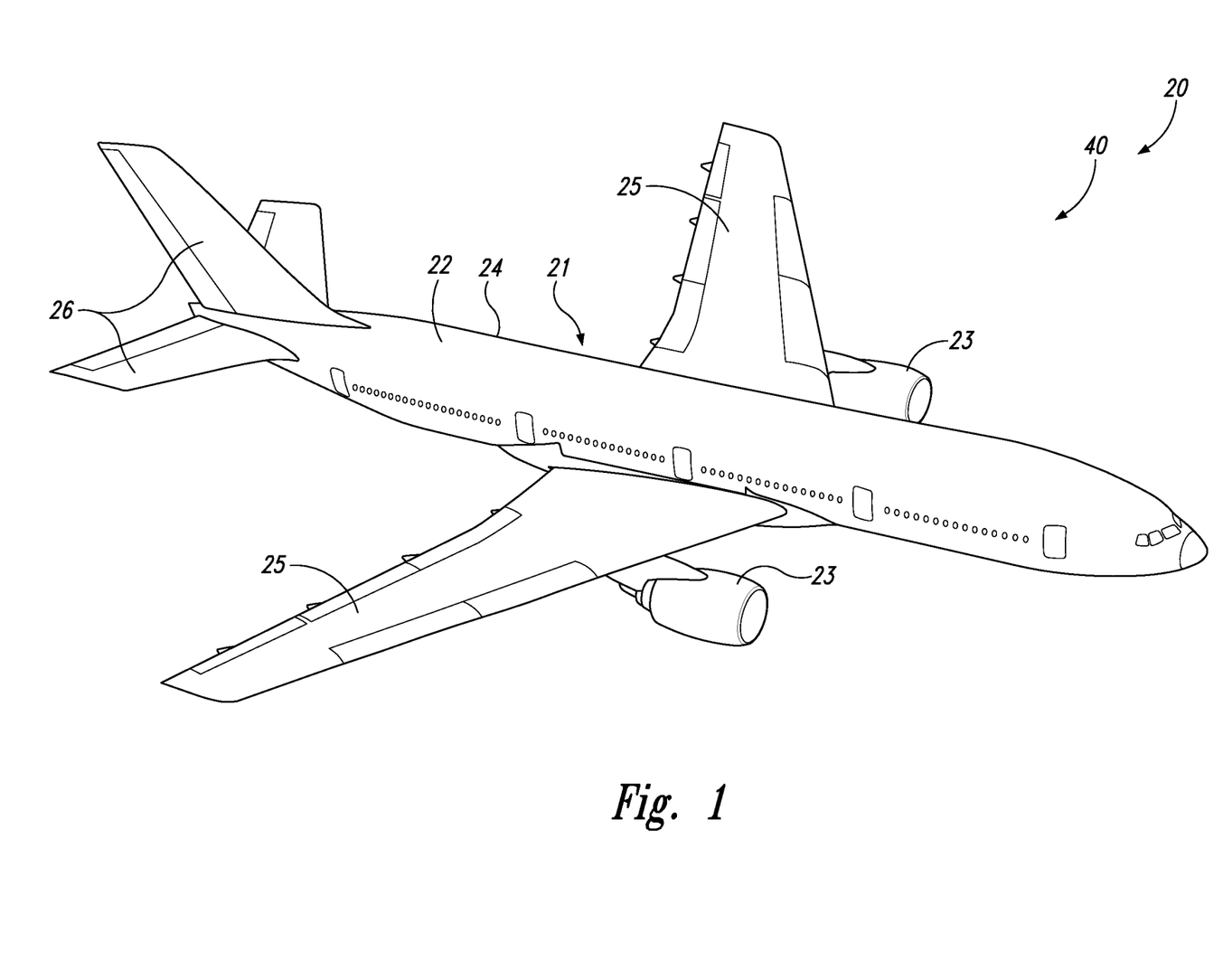
FIG. 1 is a schematic representation of an aircraft that may include a formed metallic part that may be defined utilizing the methods and process flows disclosed herein.

FIG. 1 is a schematic representation of an aircraft 20 that may include a formed metallic part 40 that may be defined utilizing the methods disclosed herein. Formed metallic part 40 may form and/or define any suitable portion of aircraft 20. As examples, the formed metallic part may form, define, and/or form a portion of one or more of an airframe 21, an interior 22, a propulsion system 23, a fuselage 24, a wing 25, and/or a stabilizer 26 of aircraft 20.

FIGS. 2-14 illustrate portions and/or steps of a process flow 100, according to the present disclosure, for diffusion bonding a first metallic sheet 61 and a second metallic sheet 64 to one another. In general, process flow 100 of FIGS. 2-14 utilizes the first metallic sheet and the second metallic sheet, together with a pneumatic seal 72 that extends therebetween, to limit, control, and/or regulate contact between oxidant, such as atmospheric oxygen, and portions of the first metallic sheet and of the second metallic sheet that are to be diffusion bonded to one another. As such, process flow 100 of FIGS. 2-14 may be utilized to diffusion bond metallic sheets 50 that otherwise would be difficult, or impossible, to diffusion bond to one another, at least without first placing the metallic sheets in an inert environment, without removing a surface oxide 51 from the metallic sheets, and/or without locating an oxide-disrupting interlayer between the metallic sheets. Additionally or alternatively, process flow 100 of FIGS. 2-14 also may be utilized to form a cleaner and/or higher-quality diffusion bond between the metallic sheets than otherwise would be possible without performing the diffusion bonding process in a more controlled environment.

Figure 2:
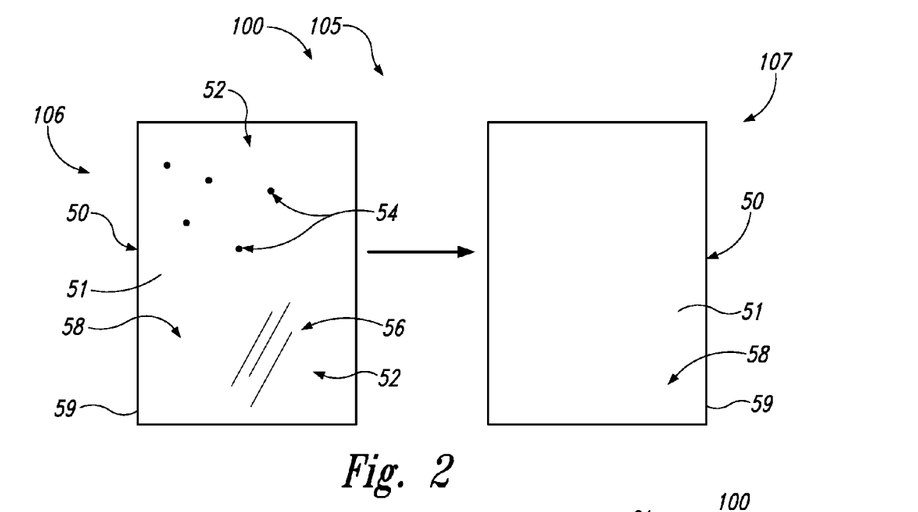
FIG. 2 is an illustration of a cleaning step in a process flow for diffusion bonding a first metallic sheet and a second metallic sheet to one another.

FIG. 2 is an illustration of a cleaning step 105 that may form a portion of process flow 100. Prior to cleaning step 105, and as indicated at 106, one or more metallic sheets 50 initially may have a contaminant 52, such as particulate matter 54 and/or a film and/or coating 56, present upon an external surface 58 thereof. Subsequent to cleaning step 105, and as indicated at 107, external surface 58 may be cleaned, particulate matter 54 may no longer be present upon external surface 58, and/or film and/or coating 56 may no longer be present upon external surface 58.

It is within the scope of the present disclosure that cleaning step 105 may be utilized to remove dirt, debris, particles, coatings, and/or films that may be washed from external surface 58 and/or that may be dissolved within a solvent. However, it is also within the scope of the present disclosure that cleaning step 105 may not remove materials that may be strongly adhered to and/or reacted with surface 58 and/or with a metal 59 that comprises metallic sheet 50. As an example, cleaning step 105 may remove particulate matter, grease, oil, and/or organic materials from metallic sheet 50. However, cleaning step 105 may not remove a surface, or native, oxide 51, that may cover and/or coat metal 59 of metallic sheet 50.

Figure 3:
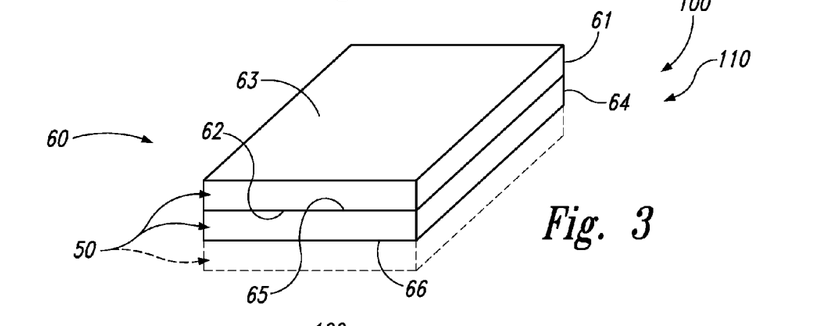
FIG. 3 is an illustration of a stacking step of the process flow for diffusion bonding the first metallic sheet and the second metallic sheet to one another.

FIG. 3 is an illustration of a stacking step 110 that may be performed during process flow 100. During stacking step 110, two or more metallic sheets 50 may be stacked to define a sheet stack 60. Sheet stack 60 includes at least two metallic sheets 50, such as a first metallic sheet 61 and a second metallic sheet 64, and may include any suitable number of metallic sheets 50. As an example, and as illustrated in dashed lines in FIG. 3, the sheet stack may include three, or even more than three, metallic sheets 50.

When sheet stack 60 includes first metallic sheet 61 and second metallic sheet 64, the sheet stack may include, have, and/or define a first internal surface 62 and/or a first external surface 63, both of which may be defined by first metallic sheet 61. In addition, the sheet stack also may include, have, and/or define a second internal surface 65 and/or a second external surface 66, both of which may be defined by second metallic sheet 64. First internal surface 62 may be opposed to, or may face away from, first external surface 63. Similarly, second internal surface 65 may be opposed to, or may face away from, second external surface 66. First internal surface 62 may face toward second internal surface 65. Conversely, first external surface 63 may be opposed to, or may face away from, second external surface 66.

Figure 4:
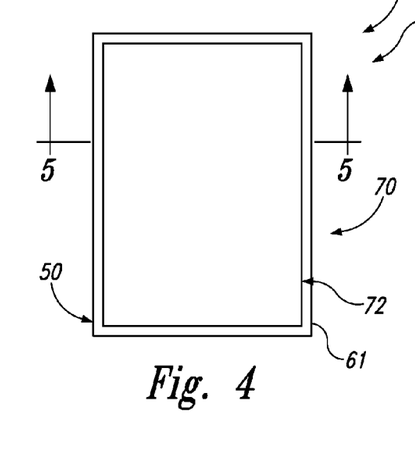
FIG. 4 is an illustration of a seal formation step of the process flow for diffusion bonding the first metallic sheet and the second metallic sheet to one another that may be utilized to define a sealed sheet stack.
Figure 5:
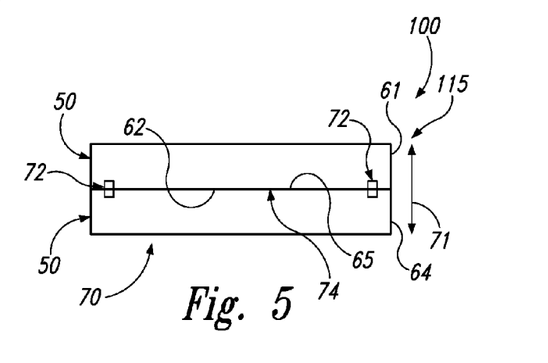
FIG. 5 illustrates a cross-sectional view of the sealed sheet stack of FIG. 4 taken along line 5-5 of FIG. 4.

FIGS. 4-5 are illustrations of a sealed sheet stack 70 that may be formed and/or defined during a seal formation step 115 of process flow 100. FIG. 4 is a schematic top view of the sealed sheet stack, while FIG. 5 is a schematic cross-sectional view of the sealed sheet stack taken along line 5-5 of FIG. 4. As illustrated in FIGS. 4-5, sealed sheet stack 70 may include a pneumatic seal 72 that may extend between first metallic sheet 61 and second metallic sheet 64. As perhaps best illustrated in FIG. 5, sealed sheet stack 70 may define a pneumatically isolated region 74, which may be bounded by first internal surface 62, second internal surface 65, and pneumatic seal 72. Generally, and when metallic sheets 50 are planar, or at least substantially planar, pneumatically isolated region 74 may define, or have, a small volume. Thus, a volume of oxidant, such as oxygen, that may be present therein also may be small and pneumatic seal 72 may restrict entry of additional ambient oxidant into the pneumatically isolated region. As discussed in more detail herein, such a configuration may prevent oxidation, or at least significant oxidation, of portions of first metallic sheet 61 and/or of second metallic sheet 64 that define pneumatically isolated region 74 during subsequent steps of process flow 100.

Figure 6:
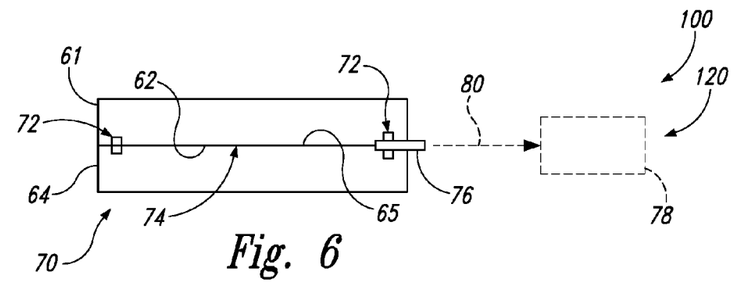
FIG. 6 illustrates an evacuation conduit that may be utilized, during the process flow for diffusion bonding the first metallic sheet and the second metallic sheet to one another, to evacuate a pneumatically isolated region that may be defined by the sealed sheet stack.

FIG. 6 illustrates that an evacuation conduit 76 may be defined within and/or attached to sealed sheet stack 70. Evacuation conduit 76 may be utilized to evacuate pneumatically isolated region 74 during an evacuation step 120 of process flow 100. As an example, and as illustrated in dashed lines in FIG. 6, a vacuum source 78 may apply a vacuum 80 to evacuation conduit 76, thereby evacuating, or at least partially evacuating, pneumatically isolated region 74. Evacuation step 120, while not required in all embodiments, may be utilized to remove a majority of the oxidant, such as oxygen, from pneumatically isolated region 74, thereby preventing oxidation, or additional oxidation, of portions of first metallic sheet 61 and/or of second metallic sheet 64 that define pneumatically isolated region 74 during subsequent steps of process flow 100.

Figure 7:
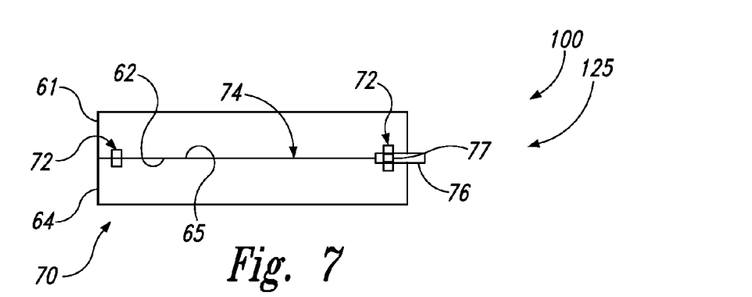
FIG. 7 illustrates that, during the process flow for diffusion bonding the first metallic sheet and the second metallic sheet to one another, the evacuation conduit may be occluded.

FIG. 7 illustrates that evacuation conduit 76 may be occluded and/or sealed, such as via and/or utilizing an occluding material and/or by defining a sealed, or sealed off, conduit 77, during conduit sealing step 125 of process flow 100. Evacuation conduit 76 may be occluded subsequent to evacuation of pneumatically isolated region 74 (i.e., subsequent to evacuation step 120 of FIG. 6), and this occlusion may prevent ambient oxidant from entering pneumatically isolated region 74.

Figure 8:
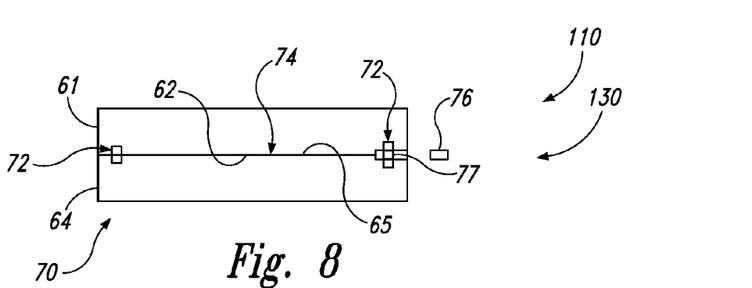
FIG. 8 illustrates that, during the process flow for diffusion bonding the first metallic sheet and the second metallic sheet to one another, a portion of the evacuation conduit may be separated from the sealed sheet stack.

FIG. 8 illustrates that a portion, or even all, of evacuation conduit 76 may be separated and/or removed from the sealed sheet stack 70 during a removing step 130 of process flow 100. Removal of the portion of evacuation conduit 76, while not required in all embodiments, may facilitate further processing of sealed sheet stack 70, such as during subsequent steps of process flow 100.

As discussed, sealed sheet stack 70 of FIGS. 4-5 may pneumatically isolate pneumatically isolated region 74 from an ambient environment that surrounds the sealed sheet stack. In addition, and as also discussed, a volume of oxidant that may be present within pneumatically isolated region 74 may be relatively low. As such, and under certain conditions, first metallic sheet 61 and second metallic sheet 64 may be diffusion bonded to one another without, or without the need for, evacuation step 120, conduit sealing step 125, and/or removing step 130 of FIGS. 6-8. With this in mind, and while process flows 100 that include evacuation step 120, conduit sealing step 125, and/or removing step 130 further may reduce contact between oxidant and first internal surface 62 and/or second internal surface 65, these process steps may not be required in all embodiments and/or with all metallic sheets 50.

Figure 9:
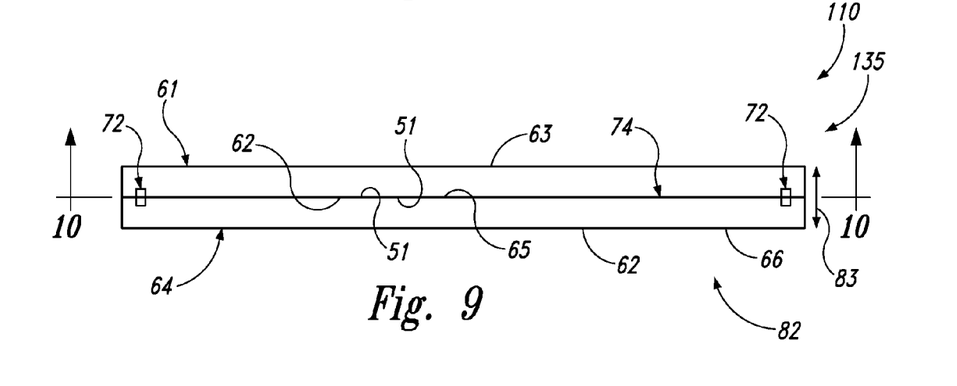
FIG. 9 illustrates that, during the process flow for diffusion bonding the first metallic sheet and the second metallic sheet to one another, a surface area of the sealed sheet stack may be increased to disrupt oxide layers on metallic sheets and define an expanded sheet stack.
Figure 10:
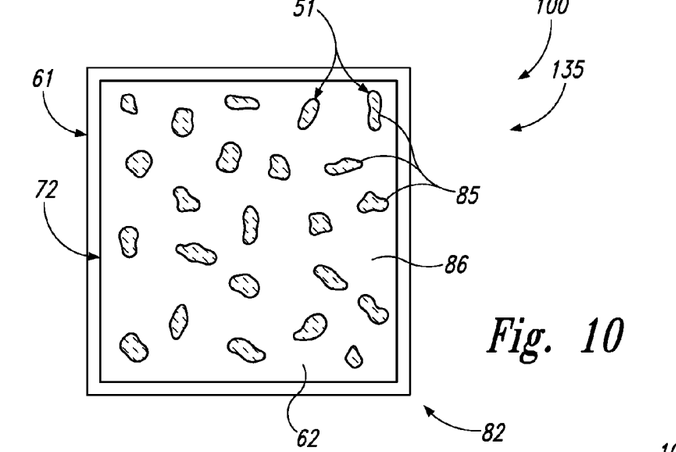
FIG. 10 is a schematic cross-sectional view of the expanded sheet stack of FIG. 9 taken along line 10-10 of FIG. 9.

FIG. 9 illustrates that process flow 100 may include a disrupting step 135 that may be utilized to disrupt, or break apart, a surface oxide 51 that may be present on first internal surface 62 and/or on second internal surface 65, thereby defining an expanded sheet stack 82 and/or permitting diffusion bonding of the first internal surface to the second internal surface during subsequent steps of process flow 100. FIG. 10 is a schematic cross-sectional view of the expanded sheet stack of FIG. 9 taken along line 10-10 of FIG. 9.

Disrupting step 135 may include increasing a surface area of sealed sheet stack 70 of any of FIGS. 4-8 to form, define, and/or generate expanded sheet stack 82. Expanded sheet stack 82 may have a greater overall surface area when compared to sealed sheet stack 70. As examples, a surface area of first internal surface 62 of expanded sheet stack 82 may be greater than a surface area of first internal surface 62 of sealed sheet stack 70, a surface area of second internal surface 65 of expanded sheet stack 82 may be greater than a surface area of second internal surface 65 of sealed sheet stack 70, a surface area of first external surface 63 of expanded sheet stack 82 may be greater than a surface area of first external surface 63 of sealed sheet stack 70, and/or a surface area of second external surface 66 of expanded sheet stack 82 may be greater than a surface area of second external surface 66 of sealed sheet stack 70.

A thickness 83 of expanded sheet stack 82 (as illustrated in FIG. 9) may be less than a thickness 71 of sealed sheet stack 70 (as illustrated in FIG. 5). However, this is not required.

As illustrated in FIG. 10, the increase in surface area may cause a surface, or native, oxide 51, which may be present on the first metallic sheet and/or on the second metallic sheet, to break apart into separate, distinct, and/or spaced-apart domains 85. As discussed, pneumatically isolated region 74, which is illustrated in FIG. 9, may contain very little oxidant. Thus, the first internal surface of the first metallic sheet and/or on the second internal surface of the second metallic sheet may not re-oxidize, thereby causing domains 85 to be separated by regions of bare and/or unoxidized metal 86. In systems in which domains 85 are relatively stable and pneumatically isolated region 74 is well-isolated from ambient oxidant, bare and/or unoxidized metal 86 may persist for a period of time that is sufficient to permit subsequent diffusion bonding between the first metallic sheet and the second metallic sheet.

Figure 11:
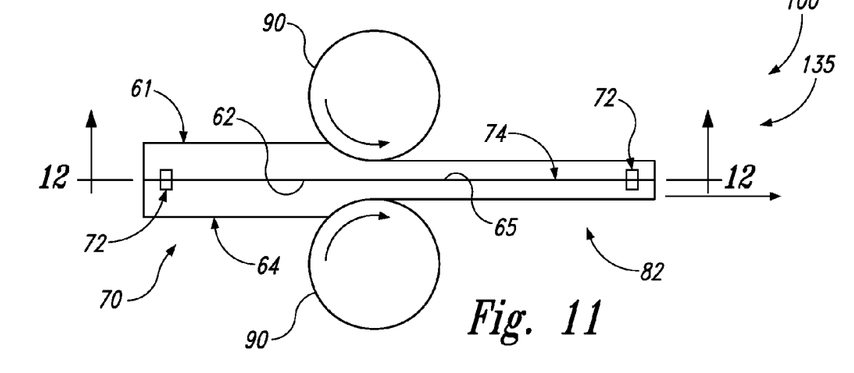
FIG. 11 illustrates that a rolling process that may be utilized to generate the expanded sheet stack during the process flow for diffusion bonding the first metallic sheet and the second metallic sheet to one another.
Figure 12:
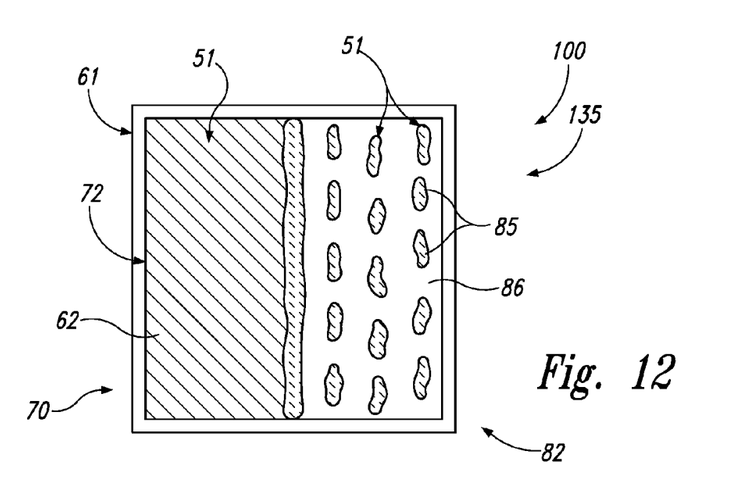
FIG. 12 is a schematic cross-sectional view of the rolling process of FIG. 11 taken along line 12-12 of FIG. 11.

FIG. 11 illustrates a rolling process that may be utilized to generate expanded sheet stack 82 from sealed sheet stack 70. FIG. 12 is a schematic cross-sectional view of the rolling process of FIG. 11 taken along line 12-12 of FIG. 11. During the rolling process, sealed sheet stack 70 may be fed, or drawn, between two or more rollers 90. These rollers may compress sealed sheet stack 70, thereby thinning the sealed sheet stack, as discussed, and also increasing a size, or surface area, of the sealed sheet stack. As is known in the art, the rolling process may be repeated any suitable number of times to decrease the thickness of the sealed sheet stack and/or to increase the surface area of the sealed sheet stack by any suitable amount.

The left side of FIG. 12 illustrates that, prior to the rolling process and/or prior to the increase in surface area, the first internal surface of the first metallic sheet and/or the second internal surface of the second metallic sheet may have a continuous, or at least substantially continuous, surface oxide 51 present thereon. In contrast, the right side of FIG. 12 illustrates that, subsequent to the rolling process and/or subsequent to the increase in surface area, surface oxide 51 may be separated into domains 85 with bare and/or unoxidized metal 86 extending therebetween.

Figure 13:
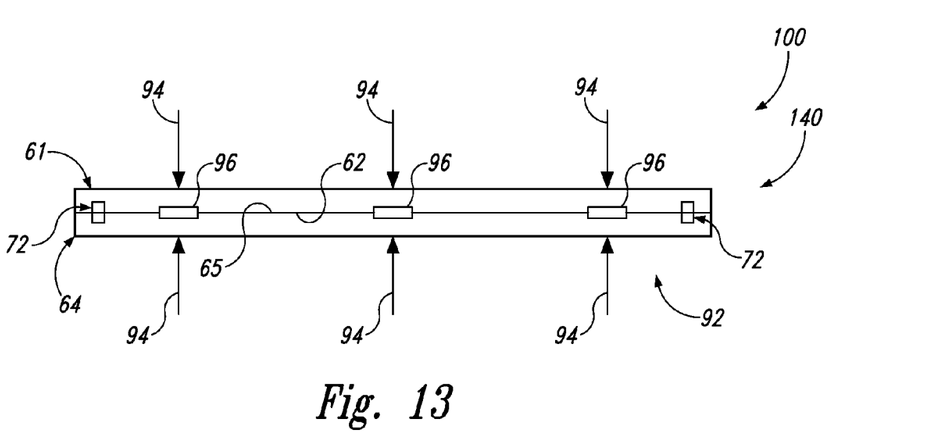
FIG. 13 illustrates that, during the process flow for diffusion bonding the first metallic sheet and the second metallic sheet to one another, the expanded sheet stack may be diffusion bonded to define a diffusion bonded sheet stack.

FIG. 13 illustrates that process flow 100 may include a diffusion bonding step 140 that may be utilized to diffusion bond first metallic sheet 61 and second metallic sheet 64 of expanded sheet stack 82 (of FIGS. 9-12) to one another, thereby defining a diffusion bonded sheet stack 92. During diffusion bonding step 140, portions of first metallic sheet 61, together with opposed and/or corresponding portions of second metallic sheet 64, may be compressed, such as via application of compressing forces 94, to facilitate diffusion bonding of the first metallic sheet and the second metallic sheet to one another. Additionally or alternatively, diffusion bonding step 140 may include pressing portions of first internal surface 62 against opposed and/or corresponding portions of second internal surface 65.

Diffusion bonding step 140 may be a separate and/or distinct step in which mechanical, hydraulic, and/or pneumatic mechanisms are utilized to apply compressing forces 94. Additionally or alternatively, diffusion bonding step 140 may occur during, or as a result of, forming step 145.

Regardless of the exact mechanism, timing, and/or sequencing, diffusion bonding step 140 may generate one or more diffusion bonded regions 96 within diffusion bonded sheet stack 92.

Figure 14:
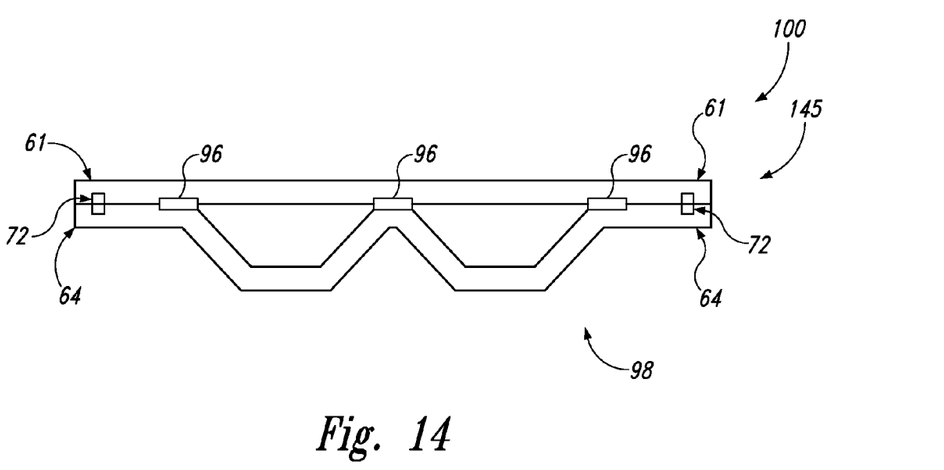
FIG. 14 illustrates that, during the process flow for diffusion bonding the first metallic sheet and the second metallic sheet to one another, the diffusion bonded sheet stack may be formed to define a formed part.

FIG. 14 illustrates that process flow 100 may include a forming step 145 that may be utilized to form diffusion bonded sheet stack 92 (of FIG. 13) into a formed metallic part 98. In formed metallic part 98, first metallic sheet 61 and/or second metallic sheet 64 may be formed and/or deformed in any suitable manner. As an example, and as illustrated, second metallic sheet 64 may be formed and/or deformed to produce and/or generate a corrugated structure within formed metallic part 98. It is within the scope of the present disclosure that forming step 145 may be performed and/or accomplished in any suitable manner. As an example, forming step 145 may include gas pressure forming, or superplastic gas pressure forming, the diffusion bonded sheet stack to produce and/or generate the formed metallic part.

Figure 15:
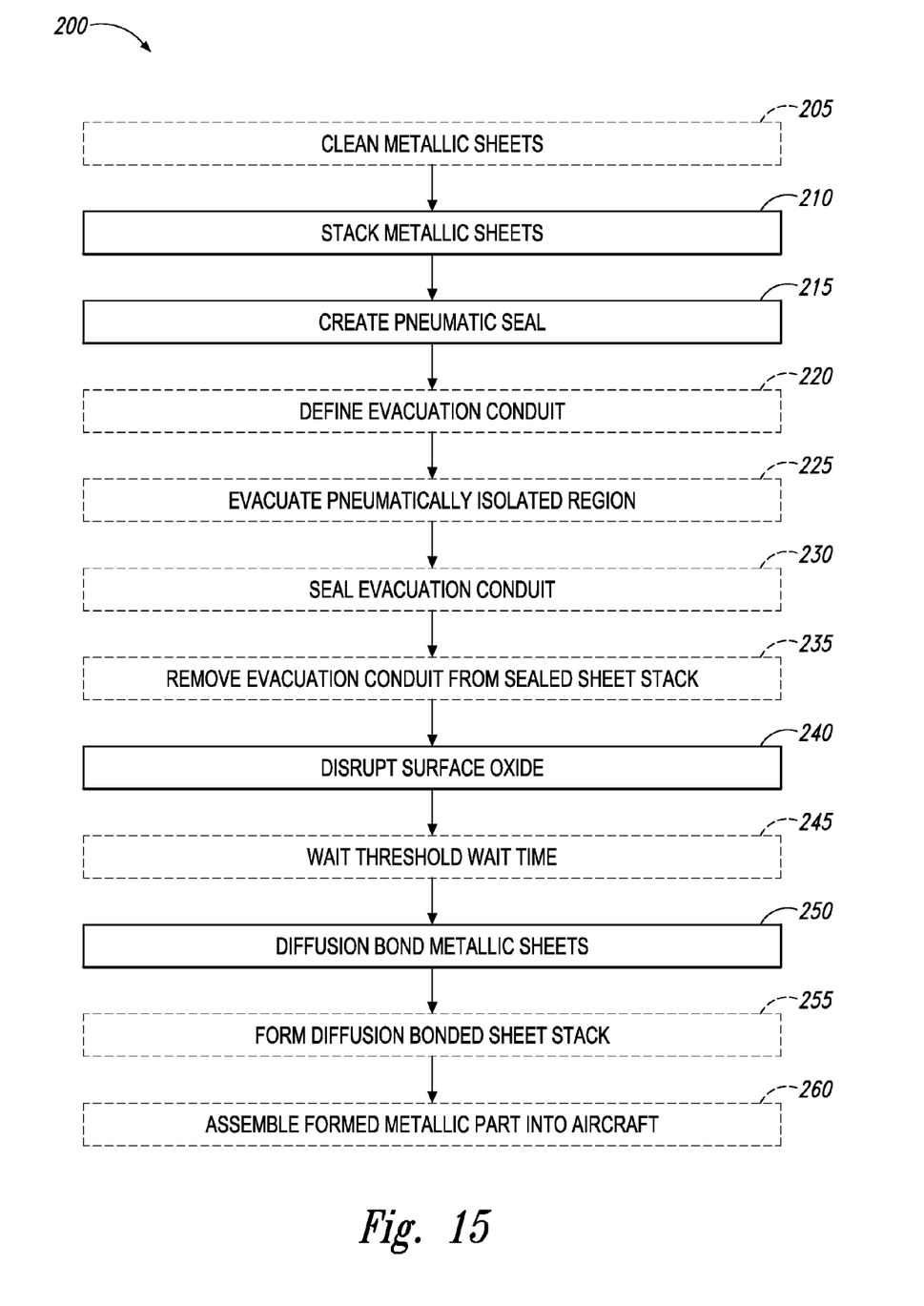
FIG. 15 is a flowchart depicting methods, according to the present disclosure, of diffusion bonding a first metallic sheet and a second metallic sheet to one another.

FIG. 15 is a flowchart depicting methods 200, according to the present disclosure, of diffusion bonding a first metallic sheet and a second metallic sheet to one another. Methods 200 may be complementary to process flow 100 of FIGS. 2-14, may be similar to process flow 100, may be alternatives to process flow 100, and/or may include and/or be alternative expressions of process flow 100. As such, any of the steps and/or details of methods 200 that are disclosed herein also may be included in and/or utilized with process flow 100 without departing from the scope of the present disclosure. Similarly, any of the steps and/or details of process flow 100 may be included in and/or utilized with methods 200 without departing from the scope of the present disclosure.

Methods 200 may include cleaning one or more metallic sheets at 205 and include stacking the metallic sheets at 210. Methods 200 further include creating a pneumatic seal between the metallic sheets to define a sealed sheet stack that defines a pneumatically isolated region at 215 and may include defining an evacuation conduit at 220, evacuating the pneumatically isolated region via the evacuation conduit at 225, sealing the evacuation conduit at 230, and/or removing the evacuation conduit from the sealed sheet stack at 235. Methods 200 further include disrupting a surface oxide at 240 and may include waiting a threshold wait time at 245. Methods 200 further include diffusion bonding the metallic sheets to define a diffusion bonded sheet stack at 250 and may include forming the diffusion bonded sheet stack to define a formed metallic part at 255 and/or assembling the formed metallic part into an aircraft at 260.

Cleaning the one or more metallic sheets at 205 may include cleaning any suitable metallic sheet that subsequently will be utilized with methods 200. As an example, the cleaning at 205 may include cleaning, or cleaning at least a portion of, a first metallic sheet and also cleaning, or cleaning at least a portion of, a second metallic sheet. As a more specific example, the cleaning at 205 may include cleaning a first internal surface of the first metallic sheet and also cleaning a second internal surface of the second metallic sheet. As another more specific example, the cleaning at 205 may include degreasing the one or more metallic sheets. FIG. 2 illustrates an example of the cleaning at 205.

Stacking the metallic sheets at 210 may include stacking at least the first metallic sheet and the second metallic sheet to define a sheet stack. The stacking at 210 may include stacking such that the sheet stack includes the first internal surface of the first metallic sheet and the second internal surface of the second metallic sheet. FIG. 3 illustrates an example of sheet stack 60 including first metallic sheet 61, which includes first internal surface 62, and second metallic sheet 64, which includes second internal surface 65.

The stacking at 210 may include stacking such that the first internal surface faces toward the second internal surface and/or such that the second internal surface faces toward the first internal surface. Stated another way, the stacking at 210 may include layering the first metallic sheet and the second metallic sheet such that the first internal surface of the first metallic sheet faces toward the second internal surface of the second metallic sheet. Stated yet another way, the stacking at 210 may include orienting the first metallic sheet and the second metallic sheet such that the first internal surface is parallel, or at least substantially parallel, to the second internal surface and/or such that the first internal surface at least partially contacts, directly contacts, and/or physically contacts the second internal surface.

The first metallic sheet also may define a first external surface, which is opposed to the first internal surface. Similarly, the second metallic sheet may define a second external surface, which is opposed to the second internal surface. Thus, the stacking at 210 further may include stacking such that the first external surface faces away from, or is opposed to, the second external surface.

Creating the pneumatic seal between the metallic sheets to define the sealed sheet stack that defines the pneumatically isolated region at 215 may include creating any suitable pneumatic seal in any suitable manner. The creating at 215 also may be referred to herein as a step for defining the sealed sheet stack.

An example of the pneumatic seal that may be created during the creating at 215 is illustrated in FIGS. 4-5. Therein, pneumatic seal 72 extends between first metallic sheet 61 and second metallic sheet 64 to define pneumatically isolated region 74. As illustrated, the pneumatically isolated region may be bounded by the first internal surface (i.e., first internal surface 62), the second internal surface (i.e., second internal surface 65), and the pneumatic seal (i.e., pneumatic seal 72).

The pneumatic seal may include and/or be a continuous pneumatic seal that surrounds and/or bounds at least a portion of the pneumatically isolated region, and it is within the scope of the present disclosure that the creating at 215 may include creating the pneumatic seal within any suitable portion and/or region of the sheet stack. As an example, and as illustrated in FIGS. 4-5, the pneumatic seal may be defined and/or may extend within an edge, or peripheral, region of the sheet stack; however, this is not required.

The pneumatic seal may include and/or be any suitable pneumatic seal that may be formed in any suitable manner. As an example, the pneumatic seal may include and/or be a weld, and the creating at 215 may include welding the first metallic sheet to the second metallic sheet. This may include spot welding the first metallic sheet to the second metallic sheet, seam welding the first metallic sheet to the second metallic sheet, and/or friction-stir welding the first metallic sheet to the second metallic sheet. Additionally or alternatively, the creating at 215 may include brazing the first metallic sheet to the second metallic sheet and/or adhering the first metallic sheet to the second metallic sheet.

Defining the evacuation conduit at 220 may include forming, creating, establishing, attaching and/or defining any suitable evacuation conduit. The evacuation conduit may extend in fluid communication with the pneumatically isolated region and/or may extend from the pneumatically isolated region. The evacuation conduit may be defined in any suitable manner. As an example, the defining at 220 may include brazing a metallic tube to the sealed sheet stack. An example of the evacuation conduit is illustrated in FIGS. 6-8 at 76.

Evacuating the pneumatically isolated region via the evacuation conduit at 225 may include evacuating in any suitable manner and may be performed subsequent to the creating at 215 and/or subsequent to the defining at 220. As examples, the evacuating at 225 may include decreasing a pressure within the pneumatically isolated region, removing a gas from the pneumatically isolated region, removing an oxidant from the pneumatically isolated region, and/or removing oxygen from the pneumatically isolated region. When the evacuating at 225 includes decreasing the pressure within the pneumatically isolated region, the pressure may be decreased by at least 50%, at least 60%, at least 70%, at least 80%, at least 90%, at least 95%, at least 99%, at least 99.9%, at least99.99%, or at least 99.999%. FIG. 6 illustrates an example of the evacuating at 225. As illustrated therein, vacuum source 78 may be utilized to apply vacuum 80 to pneumatically isolated region 74 via evacuation conduit 76.

Sealing the evacuation conduit at 230 may include blocking, limiting, occluding, and/or restricting fluid flow through the evacuation conduit, such as to prevent flow of a gas and/or oxidant into the pneumatically isolated region via the evacuation conduit. When methods 200 include the sealing at 230, the sealing at 230 may be performed subsequent to the creating at 215, subsequent to the defining at 220, subsequent to the evacuating at 225, prior to the removing at 235, and/or prior to the disrupting at 240. FIG. 7 illustrates an example of the sealing at 230. As illustrated therein, sealed conduit 77 may be generated to occlude fluid flow therethrough. The sealed conduit may be generated in any suitable manner, such as by locating an occluding material therein. An example of the occluding material includes a weld.

Removing the evacuation conduit from the sealed sheet stack at 235 may include cutting the evacuation conduit from the sealed sheet stack. The removing at 235 may be performed subsequent to the defining at 220, subsequent to the evacuating at 225, subsequent to the sealing at 230, and/or prior to the disrupting at 240. FIGS. 7-8 illustrate an example of the removing at 235.

Disrupting the surface oxide at 240 may include disrupting any suitable surface oxide, which may be formed and/or present on any suitable portion of the sealed sheet stack, in any suitable manner, such as by compressing, thinning, expanding, and/or rolling the sealed sheet stack to define an expanded sheet stack. The disrupting at 240 also may be referred to herein as a step for defining an expanded sheet stack from the sealed sheet stack and/or as a step for disrupting the surface oxide.

As an example, the disrupting at 240 may include increasing a surface area of at least a portion of the sealed sheet stack. As more specific examples, the disrupting at 240 may include increasing an internal surface area of the sealed sheet stack, increasing a surface area of the first internal surface by at least a threshold surface area increase, increasing a surface area of the second internal surface by at least the threshold surface area increase, and/or increasing an external surface area of an external surface of the sealed sheet stack.

Examples of the threshold surface area increase include surface area increases of at least 10%, at least 25%, at least 50%, at least 100%, at least 200%, at least 300%, at least 400%, at least 500%, at least 600%, at least 700%, and/or at least 800%. Additionally or alternatively, the threshold surface area increase may be at most 2000%, at most 1500%, at most 1000%, at most 750%, at most 500%, at most 400%, at most 300%, at most 200%, and/or at most 100%. The threshold surface area increase may be quantified as a difference between a surface area of a given component of the expanded sheet stack and a surface area of the same component of the sealed sheet stack.

The disrupting at 240 also may include, or the increase in surface area may be a result of, thinning of the sealed sheet stack. As an example, the disrupting at 240 additionally or alternatively may include thinning, or reducing a thickness of, the sealed sheet stack to produce and/or generate the expanded sheet stack. This thinning and/or reduction in thickness may be performed concurrently with, or may produce, the increase in surface area.

The thinning and/or reduction in thickness may include thinning, or reducing the thickness, by at least a threshold thickness decrease. Examples of the threshold thickness decrease included thickness decreases of at least 10%, at least 20%, at least 30%, at least 40%, at least 50%, at least 60%, at least 70%, at least 80%, and/or at least 90%. Additionally or alternatively, the threshold thickness decrease may be at most 99%, at most 95%, at most 90%, at most 80%, at most 70%, at most 60%, and/or at most 50%. The threshold thickness decrease may be quantified as a difference between a thickness, or average thickness, of the sealed sheet stack, and a thickness, or average thickness, of the expanded sheet stack and may be measured in a direction that is perpendicular to the first internal surface and/or that is perpendicular to the second internal surface.

As discussed herein with reference to FIGS. 9-12, and prior to the disrupting at 240 (e.g., prior to increasing the surface area of the sealed sheet stack to define the expanded sheet stack), the first internal surface of the first metallic sheet may be defined by a first surface oxide layer that covers a first metal of the first metallic sheet. Similarly, the second internal surface of the second metallic sheet may be defined by a second surface oxide layer that covers a second metal of the second metallic sheet. As also discussed, these surface oxide layers may resist and/or prevent diffusion bonding of the first metallic sheet and the second metallic sheet to one another.

However, and as illustrated in FIGS. 10 and 12, the disrupting at 240 may include separating the first and/or second oxide layers into discrete first and/or second oxide domains such that the first and/or second metals are exposed and/or define at least a portion of their respective surfaces. The exposed metals then may be diffusion bonded to one another, such as during the diffusion bonding at 250.

Waiting the threshold wait time at 245 may include waiting any suitable wait time and may be performed subsequent to the disrupting at 240 and prior to the diffusion bonding at 250. As discussed, the methods and process flows disclosed herein form and/or define a pneumatically isolated region within the sealed sheet stack and maintain pneumatic isolation of this region in the expanded sheet stack that is defined from the sealed sheet stack. As such, the metal that is exposed during the disrupting at 240 may not oxidize and/or may oxidize slowly when compared to the same metal that is exposed to oxidant and/or ambient air. Thus, the methods and process flows disclosed herein may permit the waiting at 245 without re-oxidation, or at least significant re-oxidation, of the portions of the metallic sheets that bound the pneumatically isolated region. Such a configuration may permit subsequent processing steps, such as the diffusion bonding at 250, to be delayed by at least the threshold wait time while still permitting a diffusion bond to be formed during the diffusion bonding at 250. This may provide additional flexibility to diffusion bonding processes that utilize the methods and process flows according to the present disclosure when compared to more traditional diffusion bonding processes.

It is within the scope of the present disclosure that the waiting at 245 may include waiting any suitable amount of time. As examples, the threshold wait time may be at least 1 minute, at least 5 minutes, at least 10 minutes, at least 15 minutes, at least 30 minutes, at least 45 minutes, at least 60 minutes, at least 90 minutes, at least 120 minutes, at least 180 minutes, and/or at least 240 minutes. Additionally or alternatively, the threshold waiting time may be at most 600 minutes, at most 500 minutes, at most 400 minutes, at most 300 minutes, at most 200 minutes, at most 120 minutes, and/or at most 60 minutes.

Diffusion bonding the metallic sheets to define the diffusion bonded sheet stack at 250 may include diffusion bonding at least a portion of the first metallic sheet to a corresponding portion of the second metallic sheet and may be accomplished in any suitable manner. As an example, the diffusion bonding at 250 may include pressing at least a portion of the first internal surface of the first metallic sheet against a corresponding portion of the second internal surface of the second metallic sheet. This may include compressing a corresponding portion of the expanded sheet stack, such as via and/or utilizing a first compressive force to press against the first external surface of the first sheet sack and concurrently utilizing a second compressive force to press against the second external surface of the second sheet stack. Such a configuration is illustrated in FIG. 13. The diffusion bonding at 250 also may be referred to herein as a step for defining the diffusion bonded sheet stack from the expanded sheet stack and/or as a step for diffusion bonding the expanded sheet stack to define the diffusion bonded sheet stack.

The diffusion bonding at 250 may include maintaining the expanded sheet stack at a pressing, or compressing, temperature while the portion of the first internal surface is pressed against the corresponding portion of the second internal surface and/or while the corresponding portion of the expanded sheet stack is compressed. Examples of the compressing temperature include compressing temperatures that are at least 20%, at least 30%, at least 40%, at least 50%, at least 60%, and/or at least 70% of a melting temperature of the first metal and/or of the second metal. Additionally or alternatively, the compressing temperature may be at most 90%, at most 80%, at most 70%, at most 60%, and/or at most 50% of the melting temperature of the first metal and/or of the second metal.

The diffusion bonding at 250 additionally or alternatively may include pressing, or compressing, at a pressing, or compressing, pressure. Examples of the pressing, or compressing, pressure include pressures of at least 1 Megapascal (MPa), at least 5 MPa, at least 10 MPa, at least 25 MPa, at least 50 MPa, at least 75 MPa, at least 100 MPa, at least 150 MPa, and/or at least 200 MPa. Additionally or alternatively, the pressing, or compressing, pressure may be at most 300 MPa, at most 250 MPa, at most 200 MPa, at most 150 MPa, at most 100 MPa, and/or at most 50 MPa.

The diffusion bonding at 250 further may include pressing, or compressing, for a pressing, or compressing, time. Examples of the pressing, or compressing, time include times of at least 1 minute, at least 5 minutes, at least 10 minutes, at least 15 minutes, at least 30 minutes, at least 45 minutes, and/or at least 60 minutes. Additionally or alternatively, the pressing, or compressing, time may be at most 300 minutes, at most 250 minutes, at most 200 minutes, at most 150 minutes, at most 120 minutes, at most 90 minutes, and/or at most 60 minutes.

The diffusion bonding at 250 may occur with any suitable timing and/or sequencing within methods 200. As an example, the diffusion bonding at 250 may be subsequent to the disrupting at 240 and prior to the forming at 255. As another example, the diffusion bonding at 250 may occur during, or be a result of, the forming at 255.

Forming the diffusion bonded sheet stack to define the formed metallic part at 255 may include forming, or deforming, the diffusion bonded sheet stack in any suitable manner. As an example, the forming at 255 may include gas pressure forming the diffusion bonded sheet stack to define the formed metallic part. As a more specific example, the forming at 255 may include orienting the diffusion bonded sheet stack within a forming structure and pressurizing at least a portion of the pneumatically isolated region to separate a corresponding portion of the first metallic sheet from an opposed portion of the second metallic sheet. As another more specific example, the forming at 255 may include defining a corrugated structure. A formed metallic part that may be formed during the forming at 255 and/or that includes the corrugated structure is illustrated in FIG. 14 at 98. As illustrated, the forming at 255 may include maintaining at least one diffusion bonded region 96 between the first metallic sheet and the second metallic sheet.

Assembling the formed metallic part into the aircraft at 260 may include assembling in any suitable manner and/or utilizing the formed metallic part to define any suitable portion of the aircraft. This may include operatively attaching the formed metallic part to at least one other component of the aircraft. Examples of aircraft and/or portions thereof that may include and/or utilize the formed metallic part are illustrated in FIG. 1 and discussed herein with reference thereto.

As discussed, the methods and process flows disclosed herein may permit diffusion bonding of metallic sheets that otherwise may be difficult to diffusion bond and/or may provide cheaper and/or cleaner diffusion bonding when compared to more traditional diffusion bonding techniques. With this in mind, and while not required, the methods and process flows disclosed herein may be performed without removing, without mechanically removing, and/or without chemically removing an oxide from the first metallic sheet and/or without removing, without mechanically removing, and/or without chemically removing an oxide from the second metallic sheet. Stated another way, the methods and process flows disclosed herein may be performed while respective surface and/or native oxide layers are present on both the first metallic sheet and the second metallic sheet and/or without removing these native oxide layers prior to and/or during the methods and/or process flows.

The methods and process flows disclosed herein additionally or alternatively may be performed without placing the sealed sheet stack within an inert environment and/or while the sealed sheet stack is in fluid contact with an oxidizing environment. Additionally or alternatively, the methods and process flows disclosed herein may be performed without locating an oxide-disrupting interlayer within the pneumatically isolated region and/or between the first metallic sheet and the second metallic sheet.

As used herein, the phrase "metallic sheet" may refer to any suitable metal and/or metallic body that may be diffusion bonded to another "metallic sheet." As illustrated in FIGS. 2-14, metallic sheet 50 may include a planar, or at least substantially planar, structure that includes two opposed surfaces, such as first internal surface 62 and first external surface 63, that define a majority of a surface area of the metallic sheet. However, this specific conformation is not required of all embodiments.

As discussed, certain metals, such as aluminum, may be especially difficult to diffusion bond due to rapid formation of a native surface oxide upon exposure to an oxidant, such as atmospheric air. With this in mind, and although not required in all embodiments, the first metallic sheet and/or the second metallic sheet may include, consist of, or consist essentially of aluminum and/or an aluminum alloy.

Additionally or alternatively, the first metallic sheet may include, consist of, or consist essentially of a first metal and the second metallic sheet may include, consist of, or consist essentially of a second metal. A composition, or chemical composition, of the first metal may be similar to, at least substantially similar to, or even identical to, a composition, or chemical composition, of the second metal. However, this is not required, and the first metal may be different and/or distinct from the second metal as long as the first metal and the second metal are selected such that a diffusion bond may be formed therebetween.

Examples of inventive subject matter according to the present disclosure are described in the following enumerated paragraphs:

A1. A method of diffusion bonding a first metallic sheet and a second metallic sheet to one another, the method comprising:

stacking the first metallic sheet and the second metallic sheet to define a sheet stack that includes a first internal surface that is defined by the first metallic sheet and a second internal surface that faces toward the first internal surface and is defined by the second metallic sheet;

creating a pneumatic seal between the first metallic sheet and the second metallic sheet such that the pneumatic seal, the first metallic sheet, and the second metallic sheet together define a sealed sheet stack that defines a pneumatically isolated region that is bounded by the first internal surface, the second internal surface, and the pneumatic seal;

increasing a surface area of the first internal surface and of the second internal surface by at least a threshold surface area increase by expanding the sealed sheet stack to define an expanded sheet stack; and pressing at least a portion of the first internal surface against an opposed portion of the second internal surface by compressing a corresponding portion of the expanded sheet stack to diffusion bond a corresponding portion of the first metallic sheet to an opposed portion of the second metallic sheet and define a diffusion bonded sheet stack.

A2. The method of paragraph A1, wherein the threshold surface area increase is at least one of:

(i) at least 10%, at least 25%, at least 50%, at least 100%, at least 200%, at least 300%, at least 400%, at least 500%, at least 600%, at least 700 %, or at least 800%; and (ii) at most 2000%, at most 1500%, at most 1000%, at most 750%, at most 500%, at most 400%, at most 300%, at most 200%, or at most 100%.

A3. The method of any of paragraphs A1-A2, wherein, concurrently with the increasing, the method further includes reducing a thickness of the sealed sheet stack by at least a threshold thickness decrease, optionally wherein the threshold thickness decrease is at least one of:

(i) at least 10%, at least 20%, at least 30%, at least 40%, at least 50%, at least 60%, at least 70%, at least 80%, or at least 90%; and (ii) at most 99%, at most 95%, at most 90%, at most 80%, at most 70%, at most 60%, or at most 50%.

A4. The method of any of paragraphs A1-A3, wherein the pressing includes diffusion bonding the corresponding portion of the first metallic sheet to the opposed portion of the second metallic sheet.

A5. The method of any of paragraphs A1-A4, wherein the method further includes maintaining the expanded sheet stack at a pressing temperature during the pressing, optionally wherein the first metallic sheet comprises a first metal and the pressing temperature is at least one of:

(i) at least 20%, at least 30%, at least 40%, at least 50%, at least 60%, or at least 70% of a melting temperature of the first metal; and (ii) at most 90%, at most 80%, at most 70%, at most 60%, or at most 50% of the melting temperature of the first metal.

A6. The method of any of paragraphs A1-A5, wherein the pressing includes pressing at a pressing pressure, optionally wherein the pressing pressure is at least one of:

(i) at least 1 Megapascal (MPa), at least 5 MPa, at least 10 MPa, at least 25 MPa, at least 50 MPa, at least 75 MPa, at least 100 MPa, at least 150 MPa, or at least 200 MPa; and (ii) at most 300 MPa, at most 250 MPa, at most 200 MPa, at most 150 MPa, at most 100 MPa, or at most 50 MPa.

A7. The method of any of paragraphs A1-A6, wherein the pressing includes pressing for a pressing time, optionally wherein the pressing time is at least one of:

(i) at least 1 minute, at least 5 minutes, at least 10 minutes, at least 15 minutes, at least 30 minutes, at least 45 minutes, or at least 60 minutes; and (ii) at most 300 minutes, at most 250 minutes, at most 200 minutes, at most 150 minutes, at most 120 minutes, at most 90 minutes, or at most 60 minutes.

A8. The method of any of paragraphs A1-A7, wherein, subsequent to the increasing and prior to the pressing, the method further includes waiting at least a threshold wait time, optionally wherein the threshold wait time is at least one of:

(i) at least 1 minute, at least 5 minutes, at least 10 minutes, at least 15 minutes, at least 30 minutes, at least 45 minutes, at least 60 minutes, at least 90 minutes, at least 120 minutes, at least 180 minutes, or at least 240 minutes; and (ii) at most 600 minutes, at most 500 minutes, at most 400 minutes, at most 300 minutes, at most 200 minutes, at most 120 minutes, or at most 60 minutes.

B1. A method of diffusion bonding a first metallic sheet to a second metallic sheet, the method comprising:

stacking the first metallic sheet and the second metallic sheet to define a sheet stack;

creating a pneumatic seal between the first metallic sheet and the second metallic sheet to define a sealed sheet stack that defines a pneumatically isolated region therewithin;

reducing a thickness of the sealed sheet stack by at least a threshold thickness decrease while concurrently increasing a surface area of the sealed sheet stack to define an expanded sheet stack; and compressing at least a portion of the expanded sheet stack to form a diffusion bond between a corresponding portion of the first metallic sheet and an opposed portion of the second metallic sheet and define a diffusion bonded sheet stack.

B2. The method of paragraph B1, wherein the stacking includes stacking such that the sheet stack includes a first internal surface that is defined by the first metallic sheet and a second internal surface that faces toward the first internal surface and is defined by the second metallic sheet.

B3. The method of any of paragraphs B1-B2, wherein the creating the pneumatic seal includes creating the pneumatic seal such that the pneumatic seal, the first metallic sheet, or a/the first internal surface thereof, and the second metallic sheet, or a/the second internal surface thereof, together define the pneumatically isolated region.

B4. The method of any of paragraphs B1-B3, wherein the threshold thickness decrease is at least one of:
(i) at least 10%, at least 20%, at least 30%, at least 40%, at least 50%, at least 60%, at least 70%, at least 80%, or at least 90%; and
(ii) at most 99%, at most 95%, at most 90%, at most 80%, at most 70%, at most 60%, or at most 50%.

B5. The method of any of paragraphs B1-B4, wherein the increasing includes increasing the surface area of the sealed sheet stack by at least a threshold surface area increase, and optionally wherein the threshold surface area increase is at least one of:
(i) at least 10%, at least 25%, at least 50%, at least 100%, at least 200%, at least 300%, at least 400%, at least 500%, at least 600%, at least 700 %, or at least 800%; and
(ii) at most 2000%, at most 1500%, at most 1000%, at most 750%, at most 500%, at most 400%, at most 300%, at most 200%, or at most 100%.

B6. The method of any of paragraphs B1-B5, wherein the increasing includes increasing an external surface area of an external surface of the sealed sheet stack.

B7. The method of any of paragraphs B1-B6, wherein the increasing includes increasing an internal surface area of the sealed sheet stack, wherein the internal surface area at least partially bounds the pneumatically isolated region.

B8. The method of any of paragraphs B1-B7, wherein the compressing includes pressing at least a portion of a/the first internal surface of the first metallic sheet against an opposed portion of a/the second internal surface of the second metallic sheet.

B9. The method of any of paragraphs B1-B8, wherein the method further includes maintaining the expanded sheet stack at a compressing temperature during the compressing, optionally wherein the first metallic sheet comprises a first metal and the compressing temperature is at least one of:
(i) at least 20%, at least 30%, at least 40%, at least 50%, at least 60%, or at least 70% of a melting temperature of the first metal; and
(ii) at most 90%, at most 80%, at most 70%, at most 60%, or at most 50% of the melting temperature of the first metal.

B10. The method of any of paragraphs B1-B9, wherein the compressing includes compressing at a compressing pressure, optionally wherein the compressing pressure is at least one of:
(i) at least 1 Megapascal (MPa), at least 5 MPa, at least 10 MPa, at least 25 MPa, at least 50 MPa, at least 75 MPa, at least 100 MPa, at least 150 MPa, or at least 200 MPa; and
(ii) at most 300 MPa, at most 250 MPa, at most 200 MPa, at most 150 MPa, at most 100 MPa, or at most 50 MPa.

B11. The method of any of paragraphs B1-B10, wherein the compressing includes compressing for a compressing time, optionally wherein the compressing time is at least one of:
(i) at least 1 minute, at least 5 minutes, at least 10 minutes, at least 15 minutes, at least 30 minutes, at least 45 minutes, or at least 60 minutes; and
(ii) at most 300 minutes, at most 250 minutes, at most 200 minutes, at most 150 minutes, at most 120 minutes, at most 90 minutes, or at most 60 minutes.

B12. The method of any of paragraphs B1-B11, wherein, subsequent to the reducing and prior to the compressing, the method further includes waiting at least a threshold wait time, optionally wherein the threshold wait time is at least one of:
(i) at least 1 minute, at least 5 minutes, at least 10 minutes, at least 15 minutes, at least 30 minutes, at least 45 minutes, at least 60 minutes, at least 90 minutes, at least 120 minutes, at least 180 minutes, or at least 240 minutes; and
(ii) at most 600 minutes, at most 500 minutes, at most 400 minutes, at most 300 minutes, at most 200 minutes, at most 120 minutes, or at most 60 minutes.

C1. The method of any of paragraphs A1-B12, wherein the creating the pneumatic seal includes creating the pneumatic seal within an edge region of the sheet stack.

C2. The method of any of paragraphs A1-C1, wherein the creating the pneumatic seal includes welding the first metallic sheet to the second metallic sheet.

C3. The method of paragraph C2, wherein the welding includes at least one of:
(i) spot welding the first metallic sheet to the second metallic sheet;
(ii) seam welding the first metallic sheet to the second metallic sheet; and
(iii) friction-stir welding the first metallic sheet to the second metallic sheet.

C4. The method of any of paragraphs A1-C3, wherein the creating the pneumatic seal includes brazing the first metallic sheet to the second metallic sheet.

C5. The method of any of paragraphs A1-C4, wherein the creating the pneumatic seal includes adhering the first metallic sheet to the second metallic sheet.

C6. The method of any of paragraphs A1-C5, wherein, prior to the increasing, a/the first internal surface of the first metallic sheet is defined by a first surface oxide layer that covers a/the first metal of the first metallic sheet and a/the second internal surface of the second metallic sheet is defined by a second surface oxide layer that covers a second metal of the second metallic sheet, and further wherein the increasing includes:
(i) separating the first oxide layer into discrete first oxide domains such that at least a portion of the first internal surface is defined by the first metal; and
(ii) separating the second oxide layer into discrete second oxide domains such that at least a portion of the second internal surface is defined by the second metal.

C7. The method of any of paragraphs A1-C6, wherein the increasing includes rolling the sealed sheet stack between a pair of opposed rollers.

C8. The method of any of paragraphs A1-C7, wherein, subsequent to the creating the pneumatic seal and prior to the increasing, the method further includes evacuating the pneumatically isolated region.

C9. The method of paragraph C8, wherein the method further includes defining an evacuation conduit that extends in fluid communication with the pneumatically isolated region, and further wherein the evacuating includes evacuating via the evacuation conduit.

C10. The method of paragraph C9, wherein the defining the evacuation conduit includes brazing a metallic tube to the sealed sheet stack.

C11. The method of any of paragraphs C9-C10, wherein, subsequent to the evacuating and prior to the increasing, the method further includes sealing the evacuation conduit.

C12. The method of paragraph C11, wherein, subsequent to the sealing and prior to the increasing, the method further includes removing at least a portion of the evacuation conduit from the sealed sheet stack.

D1. A method of diffusion bonding a first metallic sheet and a second metallic sheet to one another, the method comprising:

stacking the first metallic sheet and the second metallic sheet to define a sheet stack;

a step for defining a sealed sheet stack from the sheet stack, wherein the sealed sheet stack defines a pneumatically isolated region therewithin;

a step for defining an expanded sheet stack from the sealed sheet stack, wherein the expanded sheet stack has a greater surface area than the sealed sheet stack;

a step for defining a diffusion bonded sheet stack from the expanded sheet stack, wherein the diffusion bonded sheet stack includes at least one diffusion bond between at least a portion of the first metallic sheet and an opposed portion of the second metallic sheet.

E1. The method of any of paragraphs A1-D1, wherein the stacking includes layering the first metallic sheet and the second metallic sheet such that a/the first internal surface of the first metallic sheet faces toward a/the second internal surface of the second metallic sheet.

E2. The method of any of paragraphs A1-E1, wherein the stacking includes orienting the first metallic sheet and the second metallic sheet such that a/the first internal surface of the first metallic sheet is parallel, or at least substantially parallel, to a/the second internal surface of the second metallic sheet.

E3. The method of any of paragraphs A1-E2, wherein the stacking includes orienting the first metallic sheet and the second metallic sheet such that a/the first internal surface of the first metallic sheet at least partially contacts, and optionally directly and physically contacts, a/the second internal surface of the second metallic sheet.

E4. The method of any of paragraphs A1-E3, wherein the first metallic sheet defines a first external surface, which is opposed to a/the first internal surface, wherein the second metallic sheet defines a second external surface, which is opposed to a/the second internal surface, and further wherein the first external surface faces away from the second external surface.

E5. The method of paragraph E4, wherein a/the pressing/compressing includes applying a first compressive force to the first external surface and concurrently applying an opposed second compressive force to the second external surface.

E6. The method of any of paragraphs A1-E5, wherein, prior to the stacking, the method further includes cleaning at least a portion of the first metallic sheet and of the second metallic sheet.

E7. The method of paragraph E6, wherein the cleaning includes degreasing.

E8. The method of any of paragraphs E6-E7, wherein the portion of the first metallic sheet includes a/the first internal surface, and further wherein the portion of the second metallic sheet includes a/the second internal surface.

E9. The method of any of paragraphs A1-E8, wherein the method includes performing the method without at least one of:

(i) removing an oxide from the first metallic sheet;
(ii) removing an oxide from the second metallic sheet;
(iii) mechanically removing the oxide from the first metallic sheet;
(iv) mechanically removing the oxide from the second metallic sheet;
(v) chemically removing the oxide from the first metallic sheet;
(vi) chemically removing the oxide from the second metallic sheet;

E10. The method of any of paragraphs A1-E9, wherein the method includes performing the method while a respective native oxide layer is present on both a/the first internal surface of the first metallic sheet and a/the second internal surface of the second metallic sheet.

E11. The method of any of paragraphs A1-E10, wherein the method includes performing the method without placing the sealed sheet stack within an inert environment.

E12. The method of any of paragraphs A1-E11, wherein the method includes performing the method while the sealed sheet stack is in fluid contact with an oxidizing environment.

E13. The method of any of paragraphs A1-E12, wherein the method includes performing the method without locating an oxide-disrupting interlayer within the pneumatically isolated region.

E14. The method of any of paragraphs A1-E13, wherein the method further includes forming the diffusion bonded sheet stack to define a formed metallic part.

E15. The method of paragraph E14, wherein the forming includes gas pressure forming the diffusion bonded sheet stack.

E16. The method of any of paragraphs E14-E15, wherein the forming includes orienting the diffusion bonded sheet stack within a forming structure and pressurizing at least a portion of the pneumatically isolated region to separate a corresponding portion of the first metallic sheet from an opposed portion of the second metallic sheet and define the formed metallic part.

E17. The method of any of paragraphs E14-E16, wherein the forming includes defining a corrugated structure that defines the formed metallic part.

E18. The method of any of paragraphs E14-E17, wherein, during the forming, the method further includes maintaining at least one diffusion bond between the first metallic sheet and the second metallic sheet.

E19. A method of fabricating an aircraft, the method comprising:

defining a formed metallic part utilizing the method of any of paragraphs E14-E18; and operatively attaching the formed metallic part to at least one other component of the aircraft to define at least a portion of the aircraft.

E20. The method of any of paragraphs A1-E19, wherein at least one, and optionally both, of the first metallic sheet and the second metallic sheet includes, or consists essentially of, at least one of aluminum and an aluminum alloy.

E21. The method of any of paragraphs A1-E20, wherein the first metallic sheet includes, or consists essentially of, a/the first metal, wherein the second metallic sheet includes, or consists essentially of a/the second metal, and optionally wherein a composition of the first metal is similar, at least substantially similar, or identical, to a composition of the second metal.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods and process flows disclosed herein are not required to all apparatuses, methods, and process flows according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, method, or process flow. Accordingly, such inventive subject matter is not required to be associated with the specific apparatuses, methods, and process flows that are expressly disclosed herein, and such inventive subject matter may find utility in apparatuses, methods, and/or process flows that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of diffusion bonding a first metallic sheet and a second metallic sheet to one another, the method comprising:

stacking the first metallic sheet and the second metallic sheet to define a sheet stack that includes a first internal surface that is defined by the first metallic sheet and a second internal surface that faces toward the first internal surface and is defined by the second metallic sheet;

creating a pneumatic seal between the first metallic sheet and the second metallic sheet such that the pneumatic seal, the first metallic sheet, and the second metallic sheet together define a sealed sheet stack that defines a pneumatically isolated region that is bounded by the first internal surface, the second internal surface, and the pneumatic seal;

increasing a surface area of the first internal surface and of the second internal surface by at least a threshold surface area increase by expanding the sealed sheet stack to define an expanded sheet stack, wherein the increasing includes disrupting a first surface oxide on the first internal surface and disrupting a second surface oxide on the second internal surface; and pressing at least a portion of the first internal surface, which includes disrupted first surface oxide, against an opposed portion of the second internal surface, which includes disrupted second surface oxide, by compressing a corresponding portion of the expanded sheet stack to diffusion bond a corresponding portion of the first metallic sheet to an opposed portion of the second metallic sheet and define a diffusion bonded sheet stack.

2. The method of claim 1, wherein the threshold surface area increase is at least 25%.

3. The method of claim 1, wherein, concurrently with the increasing, the method further includes reducing a thickness of the sealed sheet stack by a threshold thickness decrease of at least 20%.

4. The method of claim 1, wherein the method further includes maintaining the expanded sheet stack at a pressing temperature during the pressing, wherein the first metallic sheet comprises a first metal and the pressing temperature is at least 20% of a melting temperature of the first metal and at most 90% of the melting temperature of the first metal.

5. The method of claim 1, wherein, subsequent to the increasing and prior to the pressing, the method further includes waiting a threshold wait time of at least 5 minutes.

6. The method of claim 1, wherein the first metallic sheet and the second metallic sheet consist essentially of at least one of aluminum and an aluminum alloy.

7. The method of claim 1, wherein the creating the pneumatic seal includes welding the first metallic sheet to the second metallic sheet.

8. The method of claim 1, wherein, prior to the increasing, the first internal surface of the first metallic sheet is defined by the first surface oxide layer that covers a first metal of the first metallic sheet and the second internal surface of the second metallic sheet is defined by the second surface oxide layer that covers a second metal of the second metallic sheet, and further wherein the increasing includes:

(i) separating the first surface oxide layer into discrete first oxide domains such that at least a portion of the first internal surface is defined by the first metal; and (ii) separating the second surface oxide layer into discrete second oxide domains such that at least a portion of the second internal surface is defined by the second metal.

9. The method of claim 1, wherein the increasing includes rolling the sealed sheet stack between a pair of opposed rollers.

10. The method of claim 1, wherein, subsequent to the creating the pneumatic seal and prior to the increasing, the method further includes evacuating the pneumatically isolated region.

11. The method of claim 1, wherein the method includes performing the method without at least one of:
(i) removing an oxide from the first metallic sheet;
(ii) removing an oxide from the second metallic sheet;
(iii) mechanically removing the oxide from the first metallic sheet;
(iv) mechanically removing the oxide from the second metallic sheet;
(v) chemically removing the oxide from the first metallic sheet; and
(vi) chemically removing the oxide from the second metallic sheet.

12. The method of claim 1, wherein the method includes performing the method while a respective native oxide layer is present on both the first internal surface of the first metallic sheet and the second internal surface of the second metallic sheet.

13. The method of claim 1, wherein the method includes performing the method while the sealed sheet stack is in fluid contact with an oxidizing environment.

14. The method of claim 1, wherein the method further includes forming the diffusion bonded sheet stack to define a formed metallic part.

15. A method of fabricating an aircraft, the method comprising:
defining a formed metallic part utilizing the method of claim 14; and
operatively attaching the formed metallic part to at least one other component of the aircraft to define at least a portion of the aircraft.

16. A method of diffusion bonding a first metallic sheet to a second metallic sheet, the method comprising:
stacking the first metallic sheet and the second metallic sheet to define a sheet stack;
creating a pneumatic seal between the first metallic sheet and the second metallic sheet to define a sealed sheet stack that defines a pneumatically isolated region therewithin;
reducing a thickness of the sealed sheet stack by at least a threshold thickness decrease while concurrently increasing a surface area of the sealed sheet stack to define an expanded sheet stack, wherein the reducing includes disrupting a first surface oxide on a first internal surface of the first metallic sheet and disrupting a second surface oxide on a second internal surface of the second metallic sheet; and
compressing at least a portion of the expanded sheet stack to form a diffusion bond between a corresponding portion of the first metallic sheet, which includes disrupted first surface oxide, and an opposed portion of the second metallic sheet, which includes disrupted second surface oxide, and define a diffusion bonded sheet stack.

17. The method of claim 16, wherein the threshold thickness decrease is at least 20%, and further wherein the increasing includes increasing the surface area of the sealed sheet stack by at least a threshold surface area increase of at least 25%.

18. The method of claim 16, wherein the increasing includes increasing an internal surface area of the sealed sheet stack, wherein the internal surface area at least partially bounds the pneumatically isolated region.

19. The method of claim 16, wherein the first metallic sheet and the second metallic sheet consist essentially of at least one of aluminum and an aluminum alloy.

20. A method of diffusion bonding a first metallic sheet and a second metallic sheet to one another, the method comprising:
stacking the first metallic sheet and the second metallic sheet to define a sheet stack;
a step for defining a sealed sheet stack from the sheet stack, wherein the sealed sheet stack defines a pneumatically isolated region therewithin;
a step for defining an expanded sheet stack from the sealed sheet stack, wherein the expanded sheet stack has a greater surface area than the sealed sheet stack, and further wherein the step for defining includes disrupting a first surface oxide on a first internal surface of the first metallic sheet and disrupting a second surface oxide on a second internal surface of the second metallic sheet;
a step for defining a diffusion bonded sheet stack from the expanded sheet stack, wherein the diffusion bonded sheet stack includes at least one diffusion bond between at least a portion of the first metallic sheet, which includes disrupted first surface oxide, and an opposed portion of the second metallic sheet, which includes disrupted second surface oxide.

* * * * *